(12) United States Patent
Baum

(10) Patent No.: US 7,408,949 B2
(45) Date of Patent: Aug. 5, 2008

(54) HYBRID TELEPHONE, NON-TELEPHONE NETWORK

(75) Inventor: David Baum, Ramat Gan (IL)

(73) Assignee: Coppergate Communications Ltd., Tel-Aviv (IL)

( * ) Notice: Subject to any disclaimer, the term of this patent is extended or adjusted under 35 U.S.C. 154(b) by 556 days.

(21) Appl. No.: 11/000,524

(22) Filed: Dec. 1, 2004

(65) Prior Publication Data

US 2006/0114927 A1 Jun. 1, 2006

(51) Int. Cl.
*H04L 12/413* (2006.01)
(52) U.S. Cl. .................................. 370/445; 370/463
(58) Field of Classification Search .................. None
See application file for complete search history.

(56) References Cited

U.S. PATENT DOCUMENTS

| | | | | |
|---|---|---|---|---|
| 6,732,315 | B2 * | 5/2004 | Yagil et al. | 714/755 |
| 6,747,996 | B2 * | 6/2004 | Holloway et al. | 370/503 |
| 6,922,407 | B2 * | 7/2005 | Wu | 370/355 |
| 6,940,918 | B1 * | 9/2005 | Nayler et al. | 375/295 |
| 2002/0019966 | A1 | 2/2002 | Yagil et al. | |
| 2003/0198246 | A1 | 10/2003 | Lifshitz et al. | |

FOREIGN PATENT DOCUMENTS

WO WO 01/56182 8/2001

OTHER PUBLICATIONS

"Interface Specification for HomePNA 2.0 10M8 Technology", Home Phoneline Networking Alliance, Inc., Dec. 1, 1999, USA.
"Home Phoneline Networking Alliance Market Requirements Document", Home PNA 3.0 Specification, Home Phoneline Networking Alliance, Inc., Oct. 16, 2001 USA.
Hwang et al., QoS based MAC Protocol for the Home Network, IEEE, pp. 324-333, 2001.

* cited by examiner

*Primary Examiner*—Frank Duong
(74) *Attorney, Agent, or Firm*—Daniel J. Swirsky; AlphaPatent Associates Ltd.

(57) ABSTRACT

A hybrid network includes telephone and non-telephone network media. The communication devices communicate along the hybrid network according to a media access plan. The non-telephone communication devices do not have collision detection although the telephone communication devices do. The non-telephone communication devices have higher power and sensitivity levels than the telephone communication devices. In some embodiments, the media access plan includes a registration timeslot for the non-telephone communication devices.

7 Claims, 5 Drawing Sheets

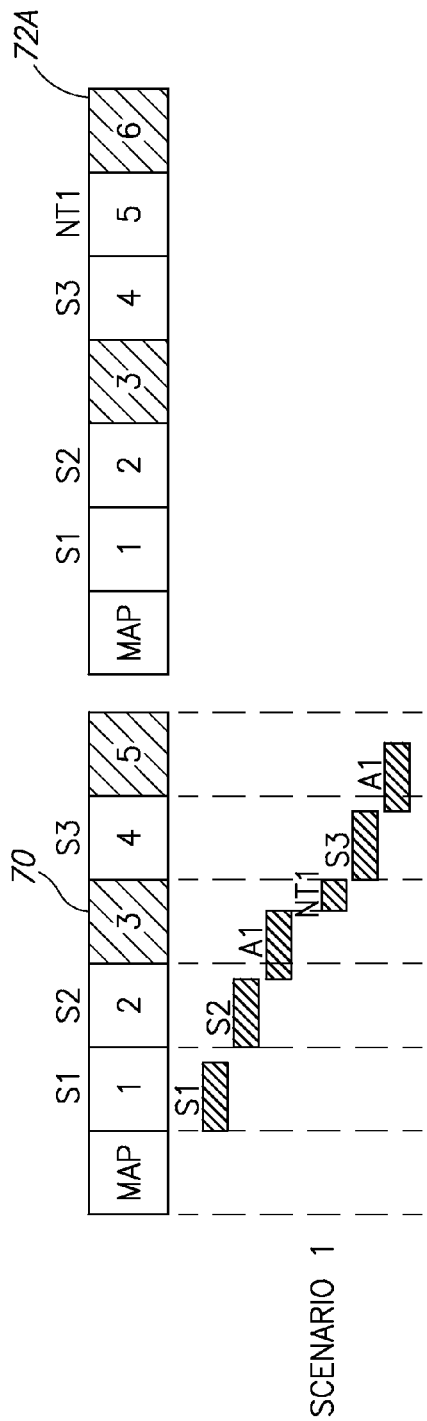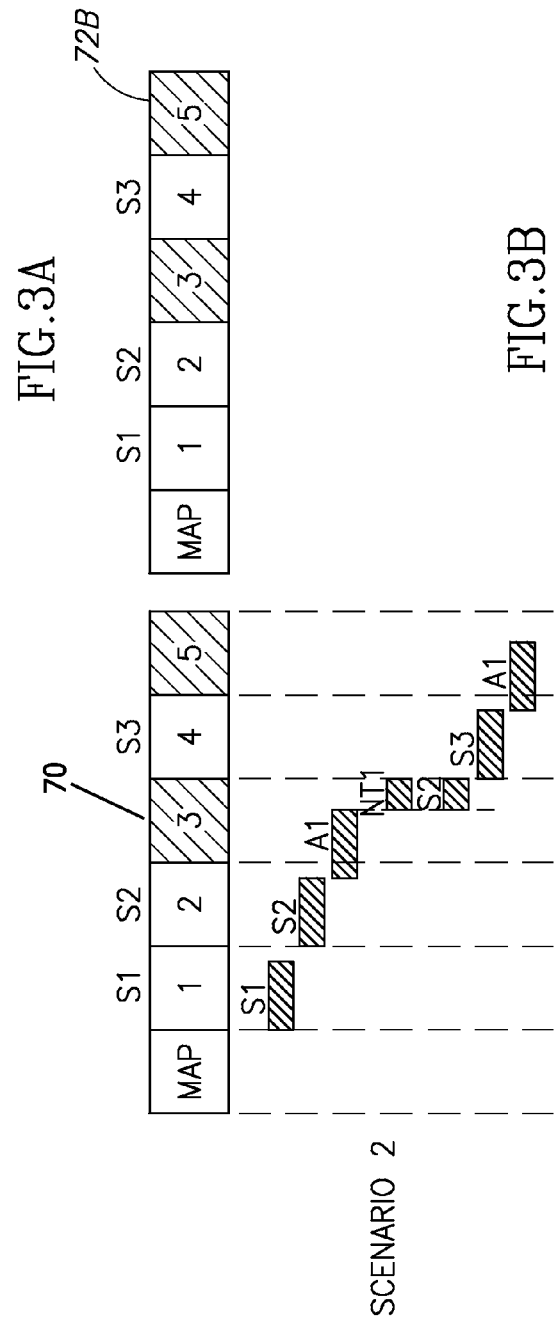
FIG.3A
FIG.3B

HYBRID TELEPHONE, NON-TELEPHONE NETWORK

FIELD OF THE INVENTION

The present invention relates to home phoneline networks generally and to such networks with mixed types of network devices in particular.

BACKGROUND OF THE INVENTION

The Home Phoneline Network Alliance (HPNA) has defined a set of standards of how to manage a data network transmitted over the phone lines in a home (rather than along separate data lines).

In HPNA v.2, the network devices are asynchronous network devices, sending messages when they sense that the network medium was available. The asynchronous network devices have collision detection (CD) abilities and can detect if another network device is transmitting at the same time that they do. If so, both network devices back off for a random amount of time after which, they retransmit the packet. Such a back off system works well for a small number of network devices, but, since the back offs are for a random amount of time, the HPNA v.2 network devices cannot guarantee quality of service for services with specific timing requirements, such as voice over IP (VOIP) or video downloads.

The most recent standard, HPNA v.3, defines a network that attempts to guarantee quality of service (QoS) requirements while being retro-compatible with the previous network devices. HPNA v.3 requires that its network devices operate synchronously, each network device being allowed to transmit only during the timeslots assigned to it. For this, at least one of the network devices has a scheduler to assign the timeslots so as to guarantee media resources to network devices, to prevent collision between multiple network devices using the same line and to ensure quality of service. The asynchronous network devices, either an HPNA v.2 network device or a non-HPNA network device, do not know the boundaries of the timeslots and thus, transmit whenever they sense that the medium is available. HPNA v.3 includes rules for handling such interruptions in the transmissions so as to minimize the effect such interruptions have on the quality of service.

BRIEF SUMMARY OF THE INVENTION

There is therefore provided, in accordance with a preferred embodiment of the present invention, a home phone line communication device. The device includes a carrier sense unit, a communication unit and a power level unit. The carrier sense unit senses when a network medium, comprising at least one telephone line and at least one coax cable, is available but does not detect collisions on the network medium. The communication unit communicates along the network medium with other communication devices according to a media access plan, wherein at least one of the other home phone line communication devices has a carrier sense/collision detection unit. The power level unit provides a power level different than that of the other communication devices.

Additionally, in accordance with a preferred embodiment of the present invention, the communication device comprises a sensitivity level unit to provide a sensitivity level different than the other communication devices.

Moreover, in accordance with a preferred embodiment of the present invention, the sensitivity level matches the power level provided by the power level unit.

There is also provided, in accordance with a preferred embodiment of the present invention, a home phone line communication device which includes a connector, a non-telephone communication unit and a power level unit. The connector is connectable to a non-telephone network medium. The non-telephone communication unit communicates along the non-telephone network medium at least to a telephone communication device connected along a telephone network according to a media access plan and the power level unit provides a power level of the non-telephone communication unit such that signals from the non-telephone communication unit have a power level along the telephone network similar to the power level of signals from the telephone communication device.

Additionally, in accordance with a preferred embodiment of the present invention, the device includes a sensitivity level unit to provide a sensitivity level to match the power level of the non-telephone communication unit a telephone.

There is also provided, in accordance with a preferred embodiment of the present invention, a home phone line communication device which includes a connector, a non-telephone communication unit and a power level unit. The connector is connectable to a non-telephone network medium. The non-telephone communication unit communicates along the non-telephone network medium at least to a telephone communication device connected along a telephone network at least during a registration timeslot of a media access plan for non-telephone communication units. The power level unit provides a power level of the non-telephone communication unit such that signals from the non-telephone communication unit have a power level along the telephone network similar to the power level of signals from the a telephone communication device.

Additionally, in accordance with a preferred embodiment of the present invention, the device also includes a sensitivity level unit to provide a sensitivity level to match the power level of the non-telephone communication unit.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A and 3B are timing diagram illustrations of two transmission scenarios with the same MAP, useful in understanding the operation of the present invention;

It will be appreciated that for simplicity and clarity of illustration, elements shown in the figures have not necessarily been drawn to scale. For example, the dimensions of some of the elements may be exaggerated relative to other elements

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
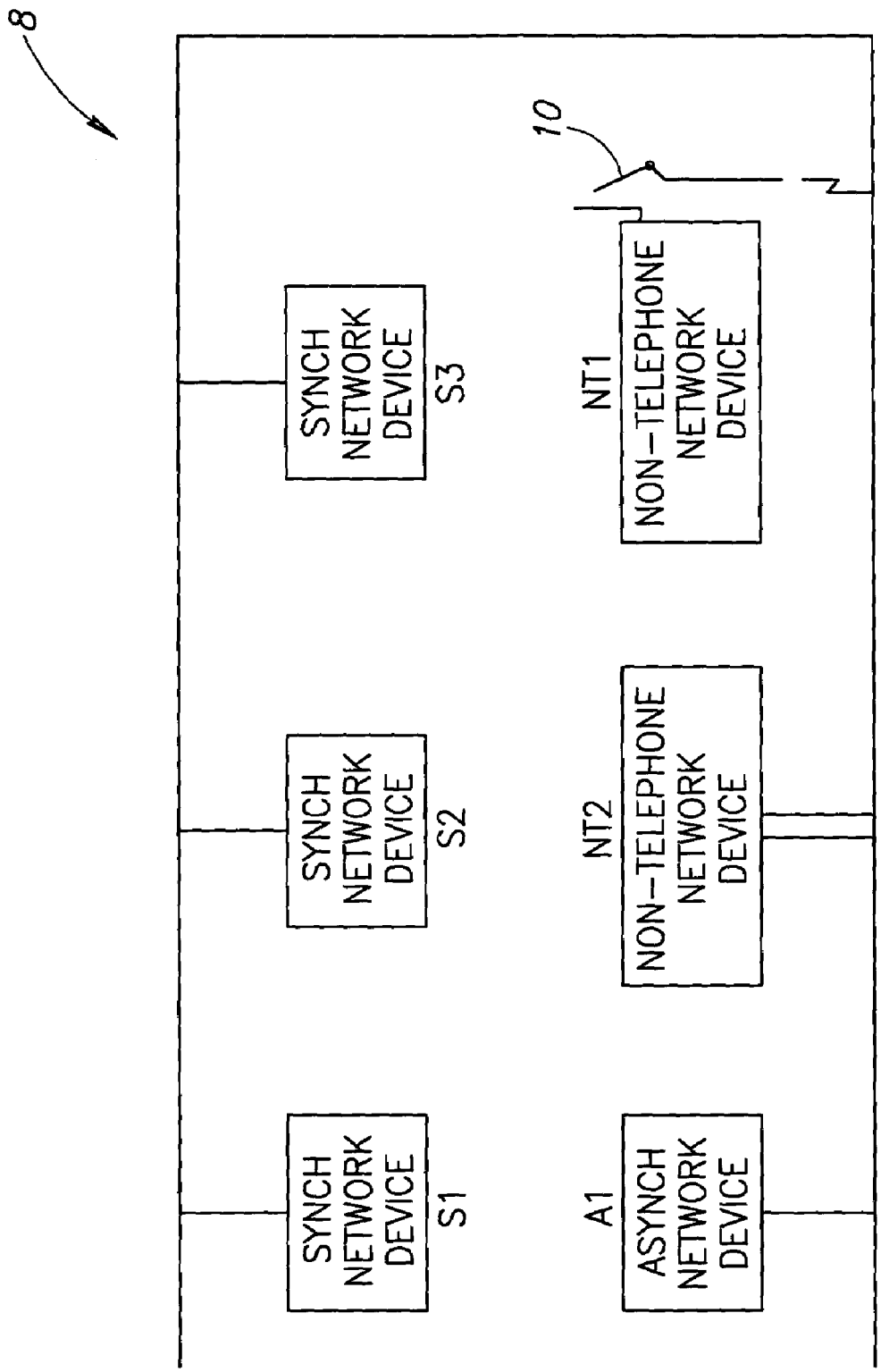
FIG. 1 is a schematic illustration of a novel data network for mixed types of network devices, constructed and operative in accordance with the present invention.

Reference is now made to FIG. 1, which depicts a novel data network 8, for mixed types of network devices. As in the prior art, data network 8 may comprise synchronous network devices Si, such as HPNA v.3 network devices, and asynchronous network devices Aj, such as HPNA v.2 network devices and others. For example, FIG. 1 shows three synchronous network devices S1, S2 and S3 and one asynchronous network device A1. It will be appreciated that there may be fewer or more devices in the network, as desired.

In accordance with a preferred embodiment of the present invention, data network 8 may also comprise non-telephone network devices NTk, where k may be any integer 1 or above, which operate without collision detection. These novel units may provide HPNA services to network devices connected to the network with wiring other than telephone wiring (shown in FIG. 1 with double lines). For example, non-telephone network devices NTk may be connected through cable wiring, power line wiring or even a wireless connection 10.

Except for the collision detection, non-telephone network devices NTk may perform most of the HPNA v.3 operations. Thus, they may sense when the medium is and is not available (known as "carrier sensing"), may receive transmissions sent to them, and may operate synchronously, transmitting during the timeslots assigned to them. However, since they do not detect collisions, they may be unable to determine if another network device transmitted at the same time that they did and thus, may have difficulties transmitting during "contention periods", when any network device is allowed to transmit, or during any other timeslot assigned to more than one network device. Typically, non-telephone network devices NTk may transmit during contention periods in order to request a timeslot or a change in timeslot allocation. Since they cannot determine if their transmission collided with another, the only way for them to determine if their transmission was received is to wait for an acknowledgement from the recipient of their transmission.

In HPNA v.3, there is a "master" responsible for generating a media access plan (MAP), defining the timeslot allocations for the network devices requiring services. U.S. Ser. No. 10/127,693, for "Adaptive Synchronous Media Access Protocol For Shared Media Networks", is assigned to the common assignee of the present application and describes the MAP used for HPNA v.3. U.S. Ser. No. 10/127,693 is incorporated herein by reference.

Figure 2:
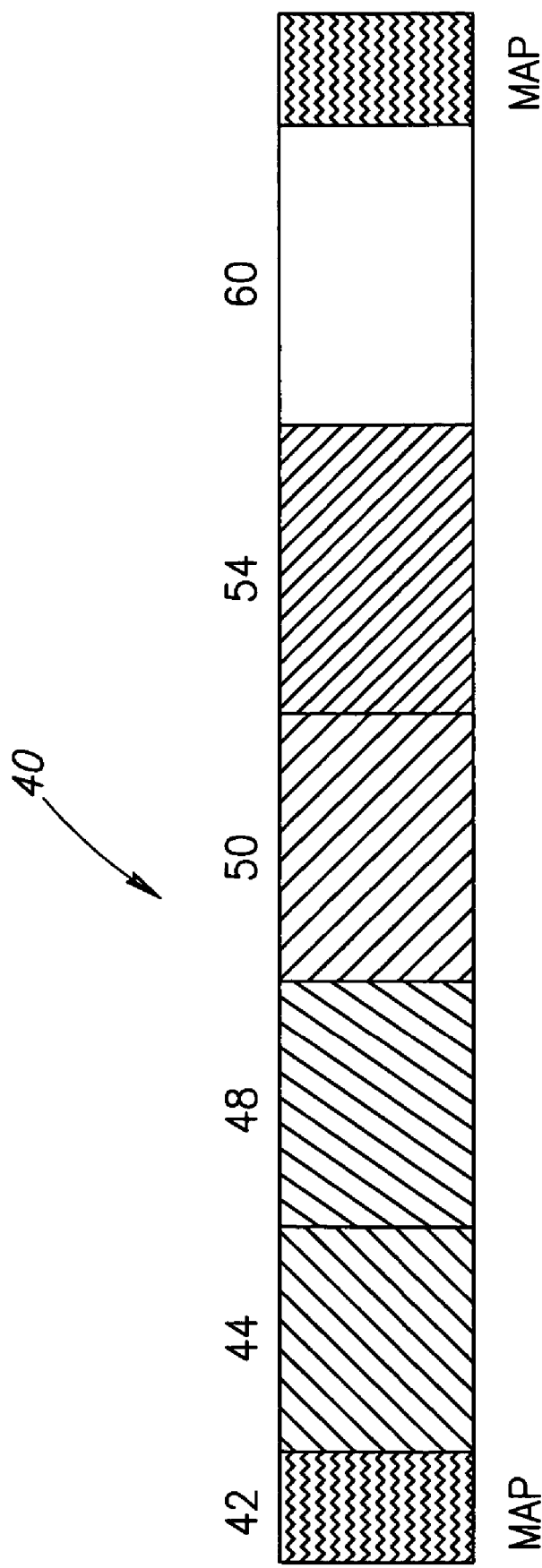
FIG. 2 is a schematic illustration of an exemplary media access plan (MAP)

FIG. 2, to which reference is now made, illustrates an exemplary MAP 40 such as may be used in HPNA v.3. MAP 40 is a detailed schedule of future transmission opportunities (TXOPs) that will be made available to the synchronous network devices in an upcoming cycle and allocates each opportunity to a particular service. MAP 40 details the start time and length of each scheduled TXOP 44, 48, 50, 54 in the next cycle of transmissions, and assigns each TXOP to a particular network device. For example, TXOP 44 may be the first TXOP and may be assigned to a digital telephony service from network device S3. TXOP 50 may be the third and it may be assigned to a video stream from network device S1. TXOP 60 may be a contention period during which any network device may transmit.

After MAP 40 has been sent to all synchronous network devices, each network device may recognize the particular TXOP that has been assigned to it according to MAP 40, and either may utilize the TXOP or may pass on it. Carrier sensors within each network device may sense if the network medium is available. If it is free to use, the network device may begin to transmit data.

Once a non-telephone network device NT has a timeslot assigned to it, it may transmit during its timeslot. For example, timeslot 50 may be assigned to a non-telephone network device NT. If an asynchronous network device, such as asynchronous network device A1, begins transmitting before timeslot 50, or if the asynchronous network device A1 interrupted at some other time during the cycle of MAP 40, non-telephone network device NT may shift its start time, as per the HPNA v.3 rules for handling interferences.

Reference is now made to FIGS. 3A and 3B, which illustrate two transmission scenarios with the same MAP 70. In FIG. 3A, non-telephone network device NT1 successfully transmits during a contention period 3 and in FIG. 3B, non-telephone network device NT1 collides with a telephone network device, such as network device S2 during contention period 3.

MAP 70 comprises 5 timeslots 1-5 where timeslot 1 is assigned to network device S1, timeslot 2 is assigned to network device S2, timeslot 3 is a contention period, timeslot 4 is assigned to network device S3 and timeslot 5 is another contention period. In FIG. 3A, network devices S1 and S2 successfully transmit during their timeslots. Device S2 does not utilize its entire timeslot and asynchronous network device A1 takes over the medium once network device S2 finishes transmitting. Non-telephone network device NT1 waits for asynchronous network device A1 to finish, after which, non-telephone network device NT1 begins its transmission. Non-telephone network device NT1, which knows the boundaries of the timeslots, ends its transmission at the end of contention period 3. Device S3 then transmits during its timeslot 4 and asynchronous network device A1 transmits thereafter and into contention period 5.

Since no network device collided with non-telephone network device NT1, the master network device (which may be any of the synchronous network devices S1-S3), received the allocation request from non-telephone network device NT1. In the next MAP, MAP 72A, the master network device has allocated a timeslot, timeslot 5, to non-telephone network device NT1 and has shifted the second contention period to timeslot 6. From MAP 72, non-telephone network device NT1 may determine that its transmission did not collide with another transmission.

Non-telephone network device NT1 may transmit during its assigned timeslot without concern of interruption.

In the scenario of FIG. 3B, MAP 70 is the same as for FIG. 3A. Synchronous network devices S1 and S2 successfully transmit. Once again, device S2 does not utilize its entire timeslot and asynchronous network device A1 takes over the medium once network device S2 finishes transmitting. Non-telephone network device NT1 waits for asynchronous network device A1 to finish, after which, non-telephone network device NT1 begins its transmission during contention period 3. Unfortunately, at the same time, synchronous device S2 also begins transmission. Both devices, being synchronous, end transmission at the end of contention period 3. Synchronous device S3 utilizes its timeslot 4, after asynchronous network device A1 takes the medium.

Since non-telephone network device NT1 does not have collision detection abilities, it cannot determine that its transmission was interrupted. However, when the master transmits the next MAP, MAP 72B, there may be no timeslot allocated to non-telephone network device NT1. Thus, non-telephone network device NT1 may determine that its transmission was not successfully received. Non-telephone network device NT1 may attempt to retransmit during the next available multiple device timeslot.

Unfortunately, if the contention periods are utilized by the synchronous and asynchronous devices for significant transmission, non-telephone network devices NT1 and NT2 may interrupt them as they attempt to register with the master.

Figures 4, 5:
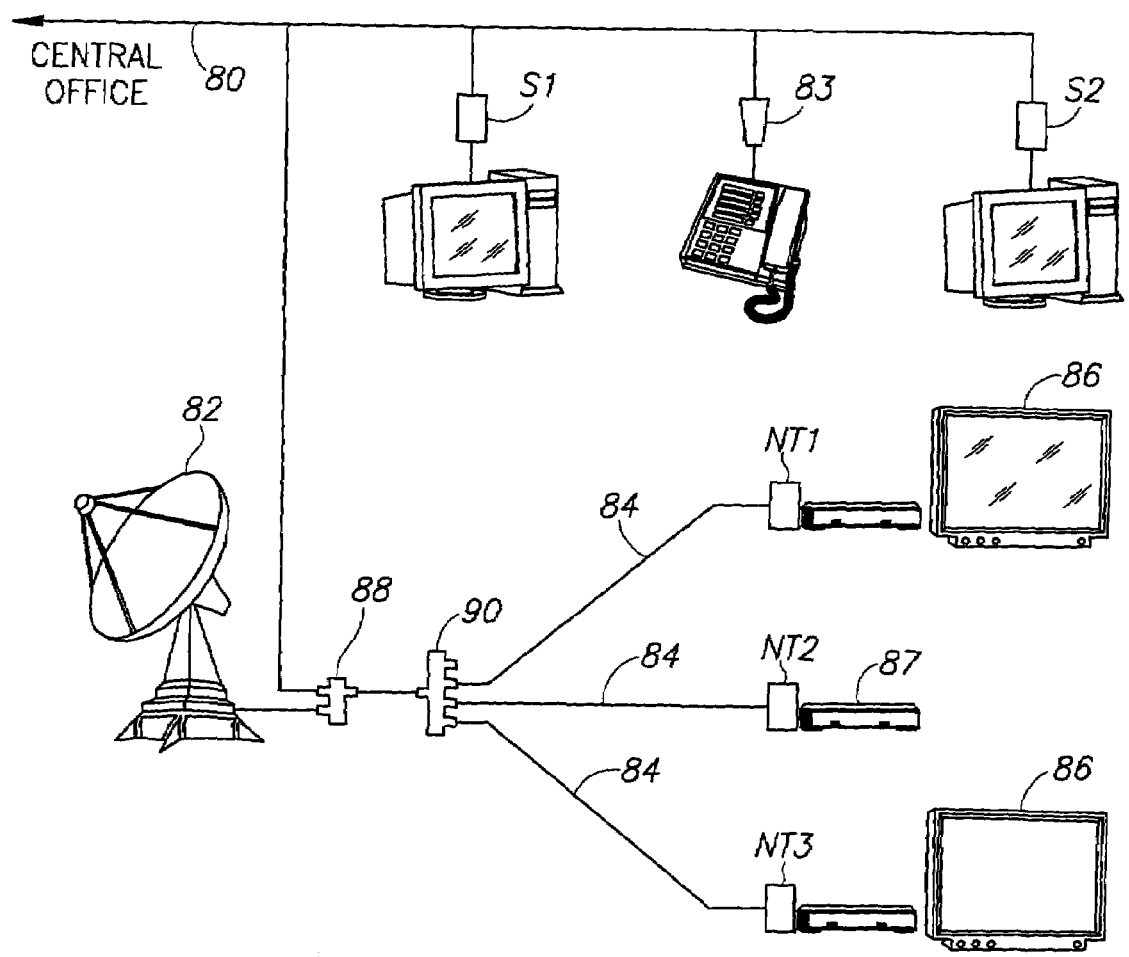
FIG. 4 is a schematic illustration of an exemplary MAP with a registration timeslot for non-telephone network devices.
FIG. 5 is a schematic illustration of an exemplary embodiment of the present invention with mixed telephone and coax wiring.

In an alternative embodiment, shown herein in FIG. 4 to which reference is now made, the master may provide a registration timeslot REG for non-telephone network devices NTk. In this embodiment, non-telephone network devices NTk may utilize registration timeslot REG to request timeslots and to change timeslot allocations. Since registration timeslot REG is allocated only to non-telephone network devices NTk, there is less chance of such devices accidentally interfering with telephone devices Si or Aj. They might interfere with other non-telephone devices, in which case, there may be a statistical back off, such as is found in the Ethernet network protocol. Registration timeslot REG may keep the non-telephone devices NTk from interfering with an existing network operation.

In FIG. 4, registration timeslot REG is shown as timeslot 3, just before a contention period in timeslot 4. Since registration timeslot REG is for non-telephone network devices NTk, contention period 4 may be utilized by synchronous devices Si and asynchronous devices Aj.

Reference is now made to FIG. 5, which illustrates one embodiment of the present invention. In this embodiment, the non-telephone wiring is coax or cable television wiring. The home having the HPNA network may have a telephone line 80, to which synchronous devices S1 and possibly asynchronous network devices, as well as telephones 81, may be attached. The synchronous and asynchronous network devices may also be connected to data devices, such as computers, printers, MP3 players, data servers, etc. Telephones 81 may be connected to the phone line via a connector 83.

The home may also have a satellite dish 82 which may provide satellite TV signals. Satellite dish 82 may be connected, through coax wiring 84, to televisions 86 and private video recorders (PVRs) 87. Coax wiring 84 and telephone wiring 80 may be combined through a combiner 88, such as the HCT-3 or HCT-4, commercially available from CommunicationsEquip.com, after which there may be a splitter 90, such as the 1 to 4 splitters commercially available from ABC-Cables.com, to provide coax wiring 84 separately to multiple televisions 86 and PVR 87. Splitter 90 may be a known device, used when cabling a home or subscriber premises, to provide coax signals to multiple devices. Splitter 90 may have a high "out to out" isolation, meaning that the signal passing between 2 outputs will be attenuated by more than 20 dB. The isolation may serve to keep the reflected signals from one television 86 or other termination point in the coax network from interfering with other termination points.

To overcome the high out-to-out isolation of splitter 90 and any attenuation caused by combiner 88, non-telephone network devices NTk, connected between splitter 90 and the coax termination points, may have a power level higher than that of synchronous network devices Si and/or of asynchronous network devices Aj. The power level may be such that the power on telephone wiring 80 due to non-telephone devices NTk may not exceed the power levels allowable on telephone wiring 80. Moreover, non-telephone network devices NTk may also have a sensitivity level adjusted to match the higher power level.

For example, if splitter 90 has an attenuation of 7 dB and combiner 88 has an attenuation of 2 dB, then they have a combined attenuation of about 9 dB. In accordance with a preferred embodiment of the present invention, non-telephone network devices NTk may have a power level set to +9 dB to compensate for the attenuation generated by the bridging between the splitter 90 and combiner 88. Furthermore, non-telephone network devices NTk may also have a sensitivity set to 9 dB more than that of synchronous network devices Si and/or asynchronous network devices Aj. If synchronous network devices Si have a power level of −7 dBm and a sensitivity level 36 dB below signal level (i.e. −43 dBm), then the sensitivity of non-telephone network devices NTk may be set to 45 dB.

In an alternative embodiment, the combined attenuation may be 6 dB and the non-telephone network devices NTk may have a power level set to +6 dB. In this embodiment, non-telephone network devices NTk may also have a sensitivity set to 6 dB more than that of synchronous network devices Si and/or asynchronous network devices Aj.

Figure 6:
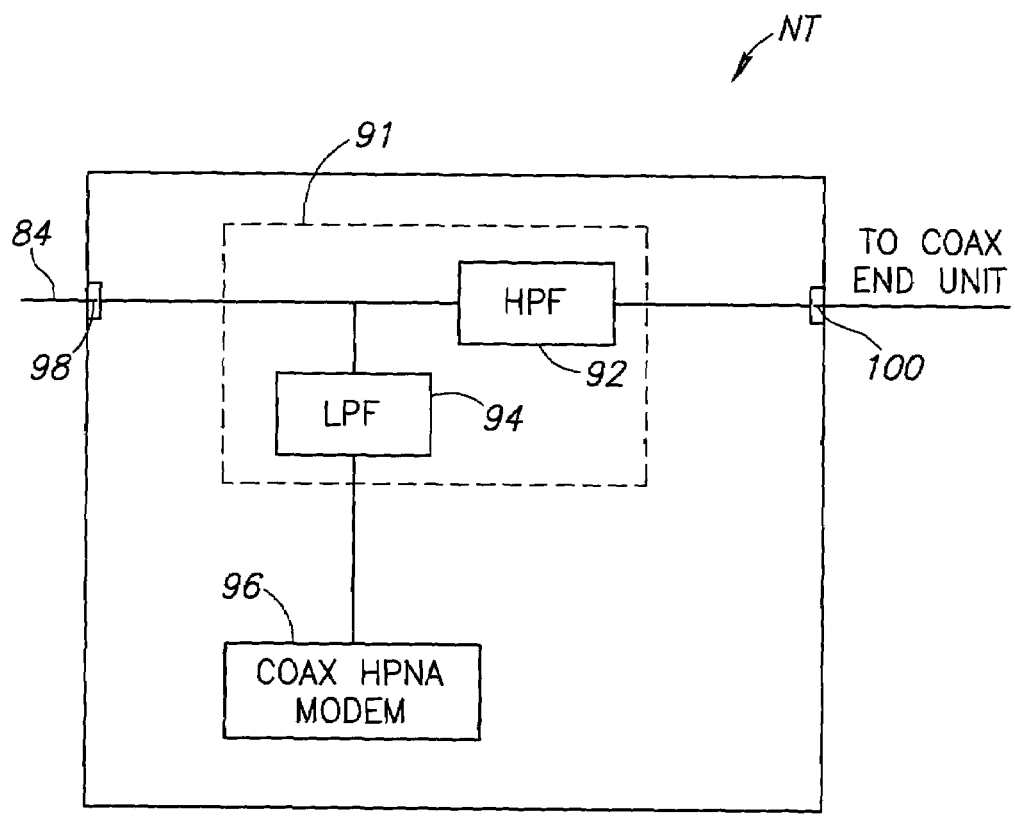
FIG. 6 is a block diagram illustration of a non-telephone network device forming part of the present invention.

Reference is now made to FIG. 6, which details non-telephone network device NT. In this embodiment, device NT may separate data network signals from broadcast network signals, providing the broadcast network signals to the coax end units (television 86 or PVR 87) and providing the data network signals to a HPNA coax modem 96.

Non-telephone network device NT may comprise a diplexer 91, comprising a high pass filter (HPF) 92 and a low pass filter (LPF) 94, and a coax HPNA modem 96. HPF 92 may be connected between a coax input connector 98 and a coax output connector 100 and may filter out the data network signals. Thus, HPF 92 may pass the frequencies above those of the HPNA network. For example, the HPNA network may operate in the range 4-28 MHz while cable and satellite networks may operate above 50 MHz. LPF 94 may be connected in parallel between coax input connector 98 and modem 96 and may filter out cable or satellite broadcast signals.

HPNA coax modem 96 may operate according to the principles discussed hereinabove. Thus, it may follow the HPNA v.3 standard with the exceptions that it may not perform collision detection, it may have a power level above that defined in HPNA v.3 and it may have a higher sensitivity level above that defined in HPNA v.3. If the master provides a registration timeslot, modem 96 may utilize the registration timeslot for communicating with the master.

It will be appreciated that FIG. 6 illustrates one embodiment of a non-telephone network device NT for coax wiring. For other types of connections, such as power line wiring or wireless systems, non-telephone device NT may have some similar elements. For example, there may be elements handling the connection to the network and removing any unwanted signals.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A home phone line communication device comprising:

a carrier sense unit to sense when a network medium, comprising at least one telephone line and at least one coax cable, is available but not to detect collisions on said network medium;

a communication unit to communicate along said network medium with other communication devices according to a media access plan, at least one of said other home phone line communication devices having a carrier sense/collision detection unit; and a power level unit to provide a power level different than that of said other communication devices.

2. The device of claim 1 and wherein said communication device comprises a sensitivity level unit to provide a sensitivity level different than said other communication devices.

3. The device of claim 2 and wherein said sensitivity level matches said power level provided by said power level unit.

4. A home phone line communication device comprising:

a connector connectable to a non-telephone network medium;

a non-telephone communication unit to communicate along said non-telephone network medium at least to a telephone communication device connected along a telephone network according to a media access plan; and a power level unit to provide a power level of said non-telephone communication unit such that signals from said non-telephone communication unit have a power level along said telephone network similar to the power level of signals from said telephone communication device.

5. The device of claim 4 and also comprising a sensitivity level unit to provide a sensitivity level to match said power level of said non-telephone communication unit a telephone.

6. A home phone line communication device comprising:

a connector connectable to a non-telephone network medium;

a non-telephone communication unit to communicate along said non-telephone network medium at least to a telephone communication device connected along a telephone network at least during a registration timeslot of a media access plan for non-telephone communication units; and a power level unit to provide a power level of said non-telephone communication unit such that signals from said non-telephone communication unit have a power level along said telephone network similar to the power level of signals from said a telephone communication device.

7. The device of claim 6 and also comprising a sensitivity level unit to provide a sensitivity level to match said power level of said non-telephone communication unit.

* * * * *